United States Patent
Wong et al.

(10) Patent No.: US 7,256,767 B2
(45) Date of Patent: Aug. 14, 2007

(54) AUTOMATIC ORIENTATION-BASED USER INTERFACE FOR AN AMBIGUOUS HANDHELD DEVICE

(75) Inventors: Yoon Kean Wong, Menlo Park, CA (US); William Robert Hanson, Mountain View, CA (US); Shawn R. Gettemy, San Jose, CA (US)

(73) Assignee: PALM, Inc., Sunnyvale, CA (US)

(*) Notice: Subject to any disclaimer, the term of this patent is extended or adjusted under 35 U.S.C. 154(b) by 117 days.

(21) Appl. No.: 11/112,173

(22) Filed: Apr. 22, 2005

(65) Prior Publication Data

US 2005/0184955 A1    Aug. 25, 2005

Related U.S. Application Data

(63) Continuation of application No. 10/006,544, filed on Nov. 30, 2001, now Pat. No. 6,888,532.

(51) Int. Cl.
G09G 5/08 (2006.01)

(52) U.S. Cl. .................................... 345/158; 345/156

(58) Field of Classification Search ................ 345/126, 345/156, 649, 659, 683, 702, 157–178, 184; 178/18.01, 18.02, 18.03; 348/333.1
See application file for complete search history.

(56) References Cited

U.S. PATENT DOCUMENTS

| | | | | | |
|---|---|---|---|---|---|
| 5,825,675 | A | * | 10/1998 | Want et al. | 708/142 |
| 5,936,619 | A | * | 8/1999 | Nagasaki et al. | 345/205 |
| 5,949,408 | A | * | 9/1999 | Kang et al. | 345/169 |
| 6,115,025 | A | * | 9/2000 | Buxton et al. | 345/659 |
| 6,888,532 | B2 | * | 5/2005 | Wong et al. | 345/156 |

* cited by examiner

Primary Examiner—Nitin I. Patel
(74) Attorney, Agent, or Firm—Shemwell Mahamedi LLP

(57) ABSTRACT

An electronic device is provided that includes a user-interface feature, a detection mechanism and one or more internal components. The user-interface feature is configurable to have a selected orientation about one or more axes. The detection mechanism can detect orientation information about the electronic device. The one or more components may select the orientation of the user-interface feature based on the detected orientation information.

26 Claims, 5 Drawing Sheets

AUTOMATIC ORIENTATION-BASED USER INTERFACE FOR AN AMBIGUOUS HANDHELD DEVICE

RELATED APPLICATION INFORMATION

This application is a continuation application of U.S. patent application Ser. No. 10/006,544, filed Nov. 30, 2001 now U.S. Pat. No. 6,888,532 entitled, "AUTOMATIC ORIENTATION-BASED USER INTERFACE FOR AN AMBIGUOUS HANDHELD DEVICE." The aforementioned parent application is hereby incorporated by reference in its entirety.

FIELD OF THE INVENTION

The present invention relates to electronic devices. In particular, the present invention relates to automatic orientation based user-interface features for an electronic device.

BACKGROUND OF THE INVENTION

Devices such as handheld computers, typically referred to as personal digital assistants (PDAs), are designed to have configurable input and output features. For example, some PDAs have configurable button options. Other PDAs have manual or application specific screen rotations.

PDAs generally have a designated orientation, centered around the use of the input/output features. For example, a typical PDA has a rectangular screen. Visual indices indicate a left and right side of the display. When content such as text is provided on the display, the content has a fixed orientation, with the left-right and top-down directions being fixed on the display. Similarly, the buttons on the PDA usually have a vertical orientation, set just below the display.

Given the fixed orientation of the typical PDA, the user has limits in how the device can be configured and oriented. For example, the device must be picked up and used in the correct orientation in order for the display to be used. The button functions assignments may be configurable, but the buttons have fixed physical locations relative to the display of the PDA.

SUMMARY OF THE INVENTION

Embodiments of the invention provide an electronic device that includes a user-interface feature, a detection mechanism and one or more internal components. The user-interface feature is configurable to have a selected orientation about at least a first axis. The detection mechanism can detect orientation information about the electronic device. The one or more components may select the orientation of the user-interface feature based on the detected orientation information.

In am embodiment, the physical orientation of an electronic device is symmetrical about two center-line axes. The orientation for those user-interface features is determined after the device is held by a user for use.

In one embodiment, the device may has a square shape, with symmetrically disposed buttons and a display. The orientation for displaying content on the display, and for assigning functions to the buttons, is determined once the device is held.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Embodiments of the invention describe an ambiguous electronic device having automatic orientation-based user interface features. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention include an ambiguous electronic device that can detect orientation information. Components of the ambiguous device, including user-interface features, are configurable based on the detected orientation of the device.

According to an embodiment, an electronic device includes a user-interface feature, a detection mechanism, and one or more components for configuring the user-interface feature. The user-interface feature is disposed symmetrically about one or more axes, and is configurable to have any one of multiple orientations. The detection mechanism detects a user-orientation for using the electronic device. The components are configured to select the orientation of the user-interface feature based on the detected user-orientation, and to configure the user-interface feature according to the selected orientation.

A user-interface feature is any feature that provides output to the user, or allows the user to enter input into the electronic device. Examples of user-interface features include a display, an input mechanism appearing on a display, or a set of actuatable surfaces.

A detection mechanism is any device that can detect orientation information, or be used in a manner that will determine orientation. Examples of detection mechanisms include sensors, actuatable surfaces and other mechanisms, that detect how the user has oriented the electronic device when using it. In one embodiment, the detection mechanism detects the orientation of the handheld during or right after the electronic device is in a power-on state.

The one or more components may refer to a processor or other component instructed to perform certain functions. Other examples of components in the electronic device include drivers, such as display drivers.

Actuatable surfaces include surfaces that act as switches when contacted by the user.

B. Ambiguous Electronic Devices

Figure 1:
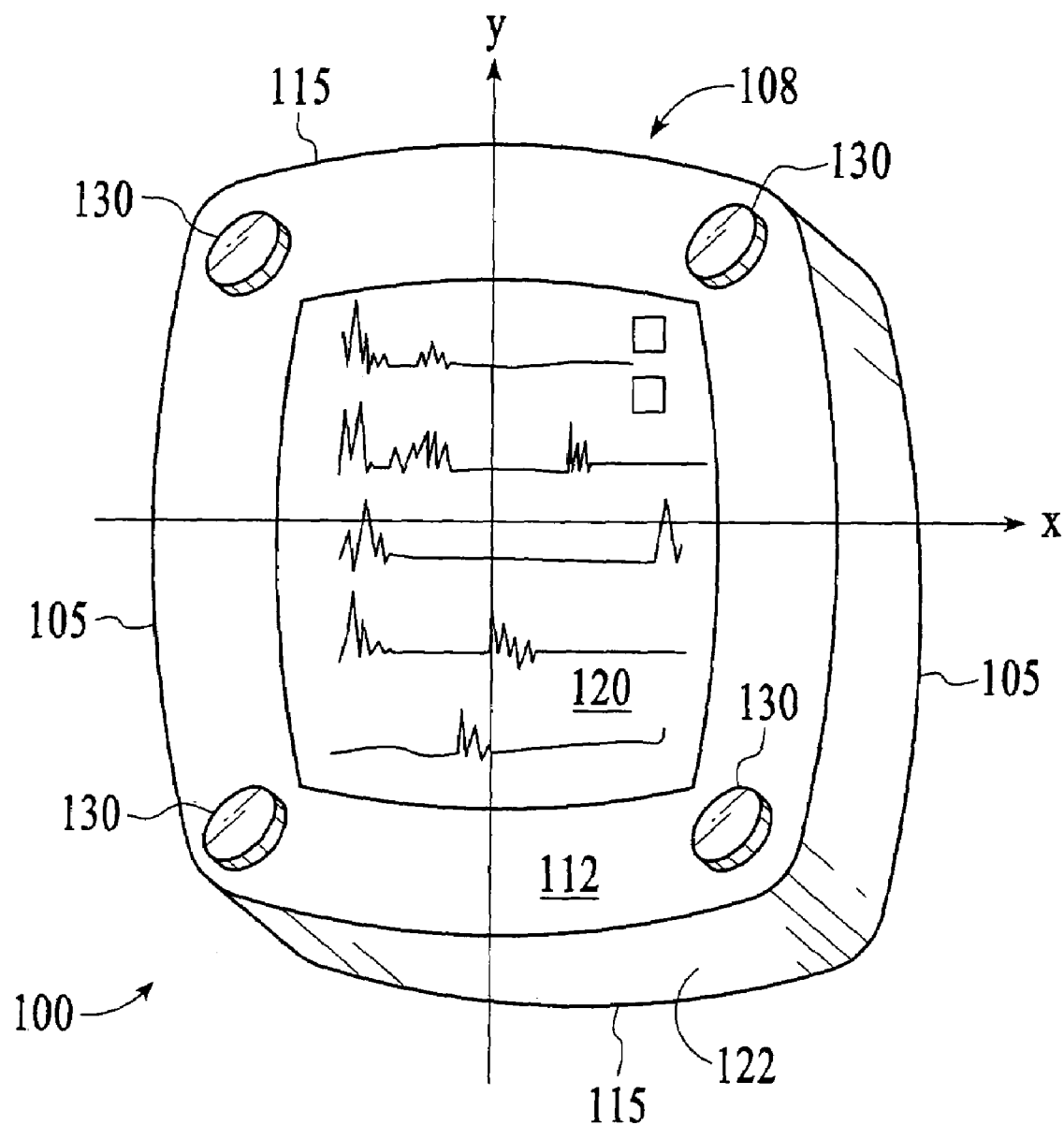
FIG. 1 is a front isometric view of an ambiguous electronic device that can be configured for multiple orientations, under an embodiment of the invention.

FIG. 1 is an isometric view of a configurable, ambiguous electronic device, under an embodiment of the invention. An electronic device 100 such as shown by FIG. 1 is symmetrical about at least two axes. This symmetry facilitates the electronic device 100 in being configured based on a detected orientation of the electronic device.

A set of user-interface features for electronic device 100 includes a display 120 and an arrangement of buttons 130. A housing 108 encases internal components of electronic device 100, and provides a front panel 112 for the set of user-interface features. The housing 108 may be referenced by a first and second pair of sides 105, 115.

Because electronic device 100 is ambiguous, it has no designated orientation for its user-interface features until its orientation is determined. The layout of the user-interface features is symmetrically disposed about the X and Y center-line axes. For example, the top/bottom and left/right sides of the electronic device are unknown when the device is in an ambiguous state.

In an embodiment, the top/bottom and left/right sides of electronic device 100 are not designated, but determined after the device is held or in use. Once the orientation of electronic device 100 becomes known, the user-interface features are configured to function using the determined orientation. For example, content appearing on display 120 will have an orientation that matches the device's use. Button actions have set positions, and the buttons 130 that cause those actions to be performed are determined based on the orientation of the device.

Conventional electronic devices have set orientations before and after when they are in use. For example, conventional electronic devices have housing structures and visual indices to inform the user of the orientation of the electronic device. In contrast, embodiments of the invention provide no indication of the device's orientation prior to its use. The electronic device 100 and its user-interface features may be symmetrically disposed about one or more axes. The housing 108 may be symmetrical. No visual indices may be provided to indicate how, for example, a user should hold the electronic device 100. The orientation of the electronic device 100 will not matter until the device is held or in use.

Accordingly, electronic device 100 may be referenced against two center-line axes X and Y. In an embodiment, the lengths of all sides 105, 115 of electronic device 100 are the same, so that electronic device 100 has a square shape. Other shapes may be contemplated for electronic device 100, including geometries symmetrical about X and/or Y. For example, other embodiments may provide that housing 108 is rectangular or circular.

The display 120 and buttons 130 are symmetrically disposed on front panel 112 about X and Y. The display 120 is centrally positioned relative to axes X and Y. The buttons 130 are positioned on each corner of the square-shaped electronic device 100.

Display 120 displays content according to an orientation using one or more reference indications on axes X and Y. A reference indication may determine a top-down or right-left direction for display 120. The reference indication will designate one of the axes X, Y as the vertical axis, the other as the horizontal axis. Furthermore, the reference indication will indicate a top/bottom end about the vertical axis and left/right end about the horizontal axis.

The reference indication is determined after orientation information is determined from electronic device 100. The orientation information may be derived from detection mechanisms, such as described with FIGS. 3 and 4. The orientation information enables components of electronic device 100 to set the vertical and horizontal directions for display 120. In this way, content such as text is displayed relative to a top and bottom, and right to left.

In an embodiment, buttons 130 are assigned actions based on the orientation information. The actions may include any one of a set of predefined functions, operations, or programs, so that actuation of one of the buttons causes a corresponding function, operation or program to be performed. The action associated with each button 130 may be determined by identifying a reference indication using the orientation information. The reference indication can be used to designate physical locations for where buttons for specified actions are to be located. For example, the reference indication may designate one of the first pair of sides 105 as a left side for housing 108, and one of the second pair of sides 115 as a right side for housing 108. The button 130 designated to be in one of the corners, such as the top-left corner, may have a pre-selected action assigned to it.

According to an embodiment, electronic device 100 is equipped to detect orientation information for the electronic device in use. Detection mechanisms, as described in Section C, may be used to provide the orientation information when the device is gripped, or otherwise used. The orientation information may indicate, for example, how a user is holding the device, whether the user is holding it with left-handedness or right-handedness, and/or whether the user-interface features are facing up or down. This orientation information may, in turn, be used to designate left, right, top and/or bottom sides on electronic device 100. In this way, the orientation information for electronic device 100 will appear in a manner that matches a user's orientation for using the device.

Similarly, features such as buttons may be assigned to actions by having predetermined locations for where buttons for each action is to be located. A button-press in the top, left corner, for example, will always identify a certain action. The orientation information is used to identify the top, left corner. The same orientation information that configures display 120 can be used to set the orientation of buttons 130.

Figure 2A:
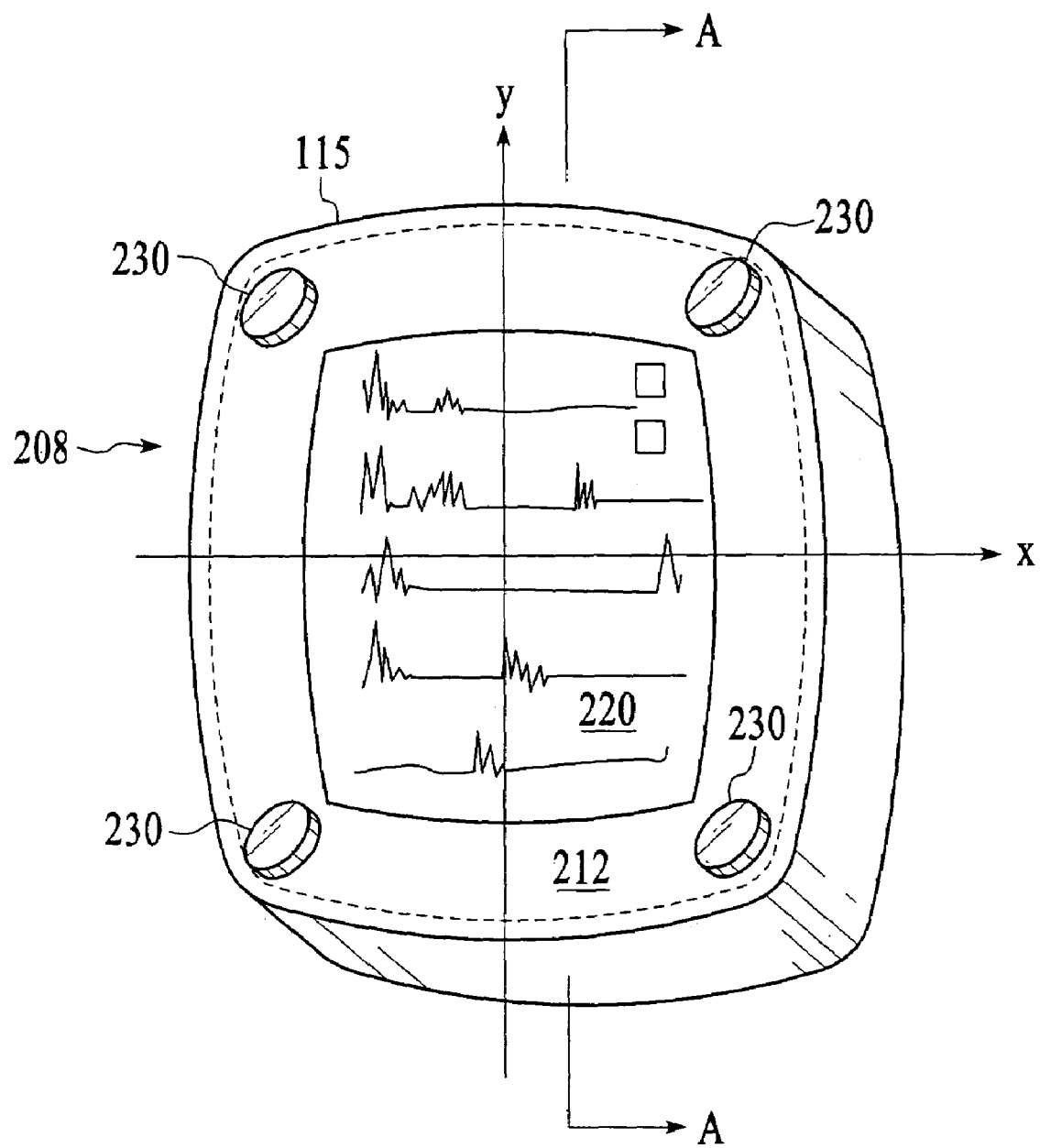
FIG. 2A is a front isometric view of an ambiguous electronic device that can be configured for multiple orientations, under another embodiment of the invention.

FIG. 2A is a front isometric view of an ambiguous electronic device that can be configured for multiple orientations, under another embodiment of the invention. In FIG. 2A, designated contact surfaces 230 may be substituted for buttons on a housing 208. A front panel 212 of housing 208 provides the user-interface features, including display assembly 220. The display assembly 220 may be a contact-sensitive display, comprising a display screen 235 (FIG. 2B) and a digitizer pad 225. The digitizer pad 225 extends over and beyond the display screen 235. The digitizer pad 225 may be used to provide contact surfaces 240 that can be contacted to enter an input signal. The contact-sensitive areas 240 appear in regions of front panel 212 where digitizer pad 225 extends beyond display surface 235. For example, one of the contact surfaces 240 may be touched by the user to signal an interrupt to a processor. In this way, contact surfaces 240 may function the same as buttons 230.

Figure 2B:
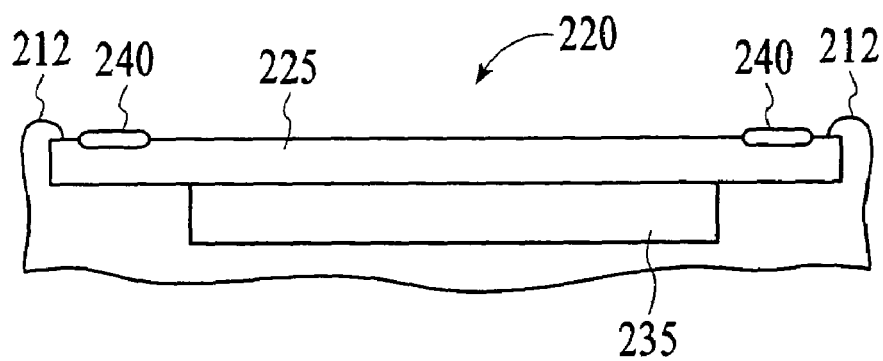
FIG. 2B is a cross-sectional view cut along lines A-A of FIG. 2A.

FIG. 2B is a cross-section of FIG. 2A, cut along lines A-A. Digitizer pad 225 extends over and beyond display screen 235. The digitizer pad 225 is configured to detect and interpret user contact on locations corresponding to either designated surfaces 240, or display assembly 220. Display surface 235 is configured to display images in the form of pixels or other graphic elements.

In one embodiment, digitizer pad 225 is formed from a material that is integrated into front panel 212. An example of this type of housing construction for an electronic device such as a handheld computer is provided in U.S. patent application Ser. No. 09/871,322, entitled "Three-Dimensional Contact-Sensitive Feature for Electronic Devices." This application is incorporated by reference herein in its entirety.

In one embodiment, orientation information is used to designate actions for designated contact surfaces 240. For example, each contact surface 240 may be one of a set, having a fixed position on front panel 212. The orientation information may be used to identify what action is to be assigned to that contact surface 240.

In another embodiment, the location of the contact surfaces 240 are not fixed, but determined by the orientation information. The orientation information may be used to interpret where contact surfaces are to appear on front panel 212, or elsewhere on housing 208. When orientation information is received, a region of digitizer pad 225 may be activated to receive input through contact with that region. Therefore, the location of each contact surface 240 is determined by the orientation information. For example, orientation information may determine that four contact surfaces 240 are needed for electronic device 200, with one contact surface at each corner. Similarly, another configuration may be interpreted from other orientation information that dictates five contact surfaces are needed for the same electronic device 200. Furthermore, the five contact surfaces may appear linearly to one side of display assembly 120.

C. Detection Mechanisms For Detecting Orientation Information

Embodiments of the invention provide for detection mechanisms that detect orientation information about an electronic device when the device is in use. The orientation information is shared with components that can configure user-interface features for a particular orientation. Specific types of detection mechanisms described in this application include touch-sensitive sensor systems, and user initiated input mechanisms.

(1) Sensor Systems

Figure 3:
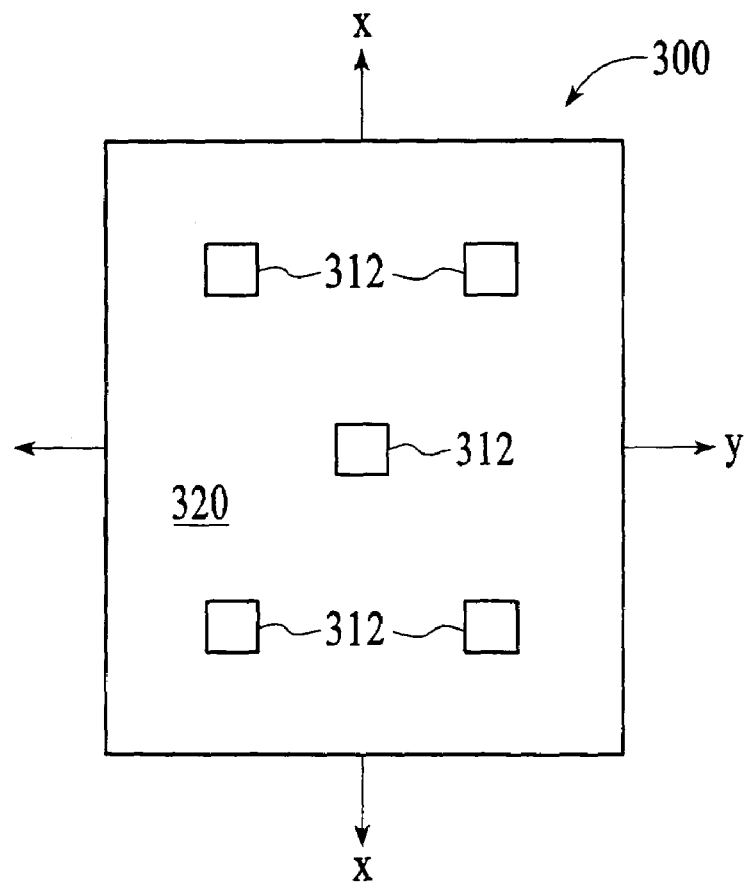
FIG. 3 is a back view of an electronic device including a sensor system for determining orientation information for the electronic device, under another embodiment of the invention.

FIG. 3 is a bottom view of electronic device 300 adapted to include an orientation-detection mechanism, under an embodiment of the invention. The electronic device 300 may be square, or otherwise ambiguous in shape. In an embodiment, the orientation mechanism is a sensor system that detects an orientation of electronic device 300 based on input that is detected by the sensor system. The reference point may, for example, be a person, or the direction of gravity.

Sensor system 310 may include a plurality of sensor pads 312. Each sensor pad 312 corresponds to a contact-sensitive surface that detects contact from a user of electronic device 300. In an embodiment, sensor pads 312 appear where a user would grip the electronic device 300. In FIG. 3, sensor pads 312 appear on a back panel 320 of electronic device 300.

The sensor pads 312 may be distributed on back panel 320. Individual sensor pads 312 may be actuated by users who contact the sensor pads in the course of gripping or handling electronic device 300. Enough sensor pads 312 may be provided or otherwise positioned so that actuated sensor pads are a subset of all the sensor pads on the back panel 320.

Orientation information may be detected by identifying the arrangement of sensor pads 312 that are actuated as a result of the user gripping the electronic device 300. For example, components of electronic device 300 may be equipped to identify one arrangement of actuated sensor pads 312 as being left-handedness, and another arrangement of actuated sensor pads 312 as being right-handedness. For example, sensor pads 312 may be gripped on one side of back panel 312 (i.e. to the left of axis X) if the user is right handed.

Figure 4:
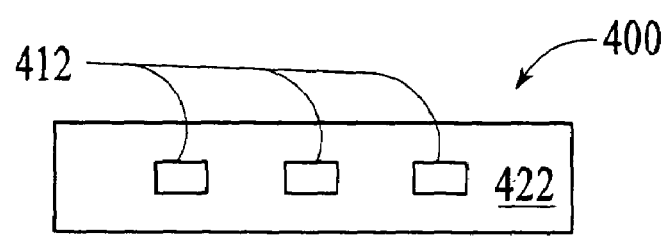
FIG. 4 is a side view of an electronic device including a sensor system for determining orientation information for an electronic device, under an embodiment of the invention.

FIG. 4 is a side view of electronic device 400 adapted to include an orientation-detection mechanism, under another embodiment. A sensor system is positioned on edges of housing 108 (FIG. 1). In one embodiment, edge surfaces 422 extending from either pair of lateral sides 105, 115 (FIGS. 1 and 2) are provided with sensor pads 412 that detect touch by the user. For a square shaped device such as shown with FIG. 1, four edge surfaces 422 may be assumed for electronic device 400. The sensor pads 412 on each edge surface 422 detect touch by the user. For example, finger tips may extend over and actuate sensor pads 412 on two or more of the edge surfaces 422.

The sensor pads 412 that are actuated by a user's grip may be used to detect orientation information, such as right/left-handedness, and top/down directions of electronic device 100. For example, when a user grips a square electronic device 100 such as shown by FIG. 1, the edge surface 422 with the greatest number of actuated surfaces may be used to identify the handedness of the user. Alternatively, the edge surface with the greatest number of actuated surfaces may indicate the left-right orientation of the device in use.

Examples of orientation information that can be determined through sensor systems such as described with FIGS. 3 and 4 include left/right-handedness, top/bottom directions, and upward/downward facing. Other types of orientation information may be provided by other embodiments.

Sensor systems such as described with FIGS. 2 and 4 may be implemented through various mechanisms. Contact-sensitive electromechanical materials that change resistance, inductance, or other electrical properties, may form sensor pads 312 (FIG. 3), 412 (FIG. 4).

(2) Housings With Integrally Formed Sensor Materials

In one embodiment, the housing of the electronic device may be formed from contact-sensitive material. The contact-sensitive material may be a unitary or integrated feature of the housing, at least in places where the sensor systems are in place. Electrical connections may be extended to a processor of the electronic device to designated housing locations from where the material is to provide contact-sensitive information.

Alternatively, the housing may incorporate the sensor material with no designated housing location for detecting contact. Rather, sufficient portions of the housing are contact-sensitive to enable contact to be located continuously over one or more of the housing's panels or surfaces. This contact may be used to determine orientation information.

With reference to FIG. 3, housing panel 320 may have an exterior layer formed from material that inherently detects user-contact. This user-contact detected from this type of material may be used to indicate the manner in which the user is holding electronic device 300. For example, the user's grip on electronic device 300 may detect whether the use is left-handed or right-handed, the left and right sides, the top and bottom sides, and/or an upward direction.

One type of material that can be used for a sensor material as an integrated portion of the housing is electronic muscle. Electronic muscle is a dielectric elastomer material that can be stretched and allowed to contract. The elastic stresses created from stretching and contracting the electronic muscle work against the electric field of the material and create electrical energy.

Electronic muscle may be used on some or all of the electronic device's housing. The electronic muscle may be made available in areas where users naturally grip the electronic device. In particular, the electronic muscle may be positioned in places such where the sensor systems are located, such as shown in FIGS. 3 and 4.

If pressure from user is detected, the electronic energy created from the contact to the electronic muscle is the input corresponding to the orientation information. The device may be configured based on this orientation information.

A more detailed description of electronic muscle is provided in a U.S. patent application entitled "Implementation of Electronic Muscles In A Portable Computer As User Input/Output Devices," filed on Aug. 30, 2001, having Ser. No. 09/944,280, and naming Shawn Gettemy and Yoon Kean Wong as inventors. The aforementioned application is hereby incorporated by reference.

Another type of material that can be used as sensor materials is known under the trade name ELEKTEX, manufactured by ELEKSEN LIMITED. This type of material detects contact through a change in electrical resistance.

An analog-digital converter (see FIG. 7) may be used with the sensor materials to detect and interpret contact with the sensor materials. The analog-digital converter changes electrical signals created through changes in the electrical properties of the materials. The analog-digital converter may also detect the position for where contact is occurring on the housing of the electronic device.

(3) User-Initiated Detection Mechanisms

Figure 6:
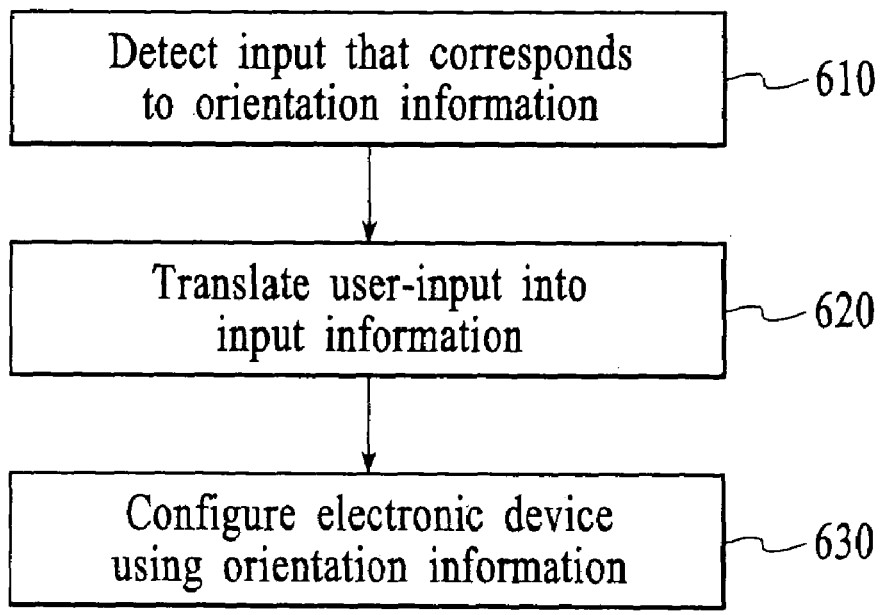
FIG. 6 is a method for configuring an electronic device based on orientation information detected from user-input, under an embodiment of the invention.

Rather than automatically detect orientation information, an electronic device such as shown in FIG. 1 may be configured to enable users to enter input that corresponds to orientation information. In these embodiments, orientation information is detected through a user-interface feature that is manually operated by the user to inform the electronic device of how it is being held. FIG. 6 illustrates a method for operating the electronic device using orientation information manually entered by the user.

For example, with reference to FIG. 1, the user presses the button 130 (FIG. 1) that is in a predetermined location on the electronic device 100 when he is holding the device. For example, the button 130 in the top left corner can be pressed by the user to set the orientation of the electronic device 100. Upon receiving the button press, the electronic device 100 configures the user-interface features based on which button 130 was pressed.

(4) Environmental Sensors

In another embodiment, environmental sensors may be used to detect orientation information used to configure the user-interface features of the electronic device. Examples of environmental sensors include accelerometers or similar devices that can be used to measure gravity.

D. Methods For Configuring User-Interface Features Of Ambiguous Devices

Figure 5:
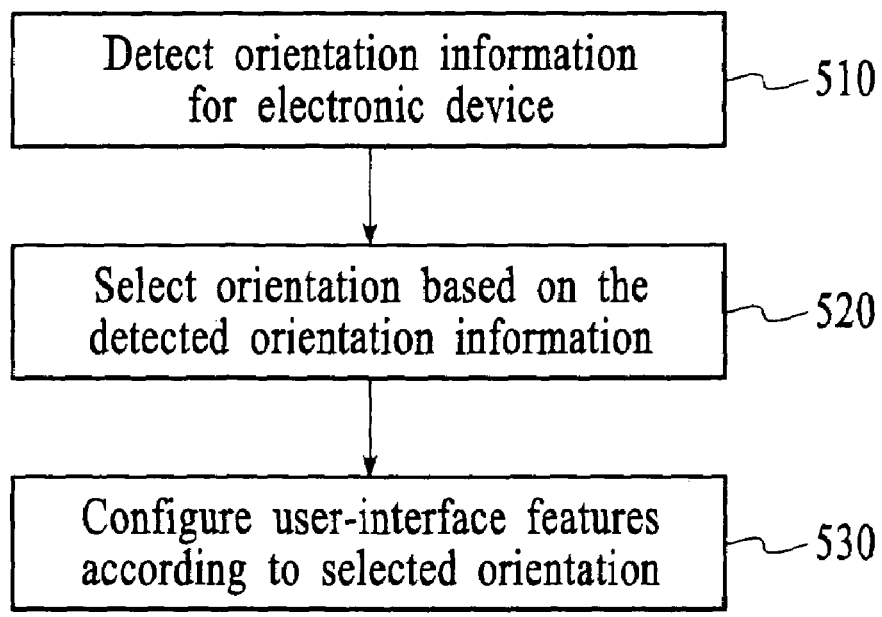
FIG. 5 is a method for configuring an electronic device based on orientation information detected from a sensor system, under an embodiment of the invention.

FIGS. 5-6 illustrate methods for configuring different types of user-interface features based on orientation information detected from a detection mechanism. Reference to numerals in other figures of this application is for illustrative purposes only.

The detection mechanisms may correspond to any combination of sensor systems, user-input mechanisms, sensor materials, or combinations thereof. Examples for detection mechanisms are described with FIGS. 3 and 4, and elsewhere in Section C.

FIG. 5 illustrates a method for configuring a user-interface feature of an electronic device based to a detected orientation. The electronic device is ambiguous when not in use, so that the orientation of its user-interface features is unknown. As described below, the orientation of the electronic device is detectable when the electronic device in held or in use. This orientation may be used to configure the user-interface features of electronic device.

In step 510, orientation information is detected. The orientation information may be detected from any number of sensor systems described above. For example, sensor systems described with FIGS. 3 and 4 may be used to gain the orientation information. Alternatively, sensor materials incorporated into the housing of the material detect the orientation of the electronic device.

In step 520, an orientation is selected for user-interface features on the electronic device. The orientation is selected based on the detected orientation information.

Step 530 provides that the user-interface features are configured according to the selected orientation.

In an embodiment such as shown by FIG. 1, the user-interface features of electronic device 100 include buttons 130 and display 120. The actions assigned to each button 130 is unknown when electronic device 100 is ambiguous. Furthermore, the direction content is to appear on display 120 is unknown.

When the device is used, orientation information is detected and used to assign actions assigned to specific buttons 130. Each of the buttons 130 may be assigned an action based on a relative position of that button to a reference point or designation. Similarly, orientation information about a reference point or designation determines the top-down and left-right direction on display 120.

For example, the reference point of electronic device 100 may coincide with a user's palm and/or fingers in gripping electronic device 100. The detection mechanism may determine the left and top side of electronic device 100 relative to the user's grip. Each of the buttons 130 may be assigned an action based on that button's position relative to the user's hand. For example, any button assigned the top left corner position when electronic device 100 is held by the user is assigned a function for that position. Similarly, display 120 displays content, receives input, and orients itself based on the detected left-right and top-down reference designations.

FIG. 6 illustrates a method for detecting orientation information through user-input. The user-input may substitute for sensors and other mechanisms that detect orientation information about the electronic device.

In step 610, input is detected that corresponds to orientation information. In one embodiment, the input may correspond to a button press to one of the buttons 130 (FIG. 1). In another embodiment, the input may correspond to actuation of one of the contact surfaces 240 (FIG. 2). The input includes an attribute or characteristic that serves as a reference designation for electronic device 100. For example, electronic device 100 (FIG. 1) may be configured so that the user must press the top, left corner button to switch the device from an ambiguous state.

Step 620 provides that the user-input is translated into orientation information. In the example provided, electronic device 100 makes a reference designation based on which button 130 is pressed to wake the electronic device 100 from the ambiguous state. In this way, the top, left corner button press designates the top, bottom, left, and right sides of electronic device 100.

Step 630 provides that electronic device 100 is configured using the detected orientation information. For example, each button may be assigned an action based on its position relative to the top-left corner. The display may be oriented top-down and left-right based on the proximity of each corner of the display to the button 130 designated as being the top-left corner.

E. Hardware Diagram

Figure 7:
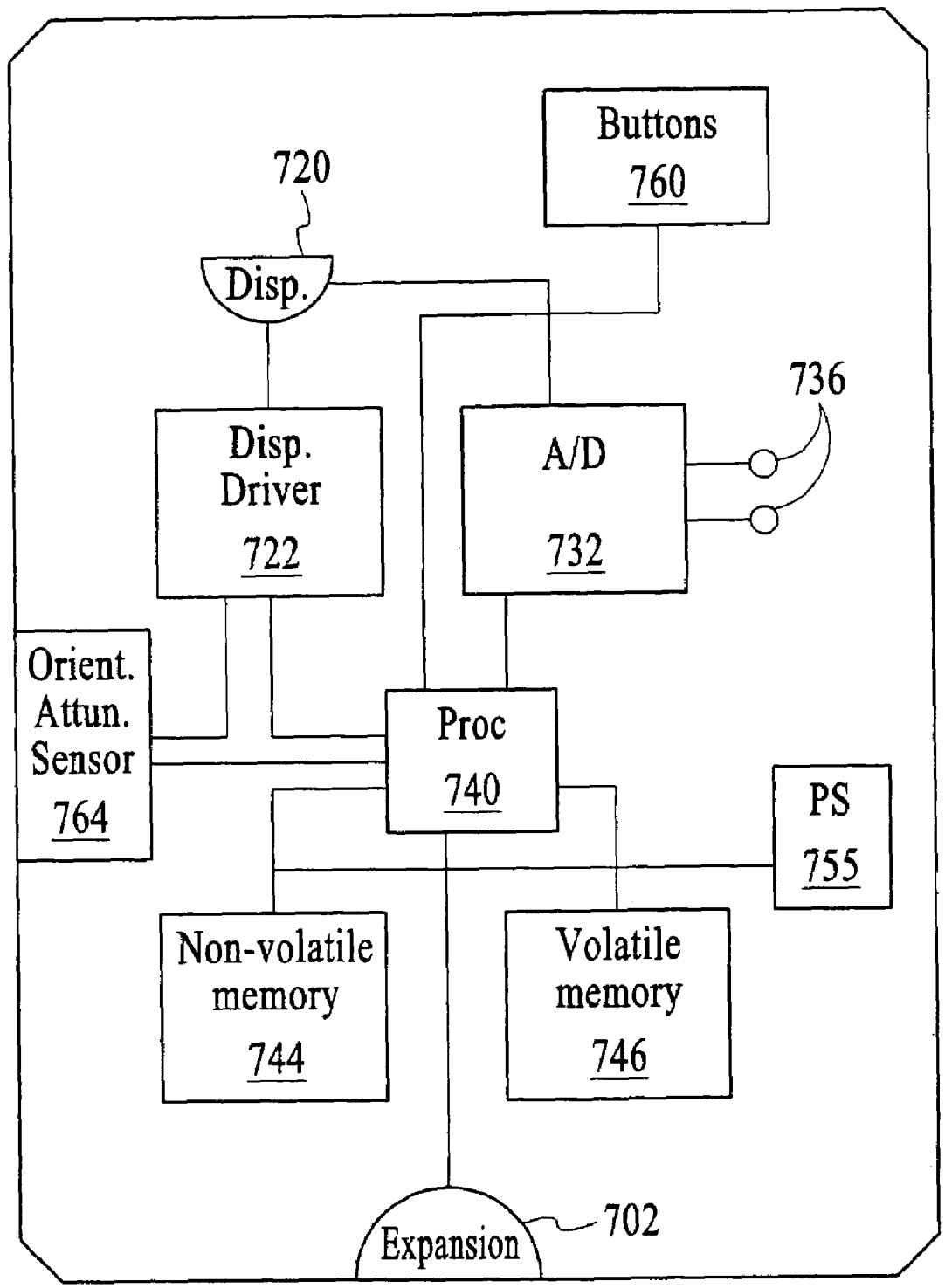
FIG. 7 is a block diagram for an electronic device configured for using orientation information, under an embodiment of the invention.

FIG. 7 is a block diagram illustrating a hardware implementation for use with an embodiment where an electronic device is a handheld computer. Handheld computers, sometimes referred to as PDAs, operate Personal Information Management software. Examples of software that can be operated by a handheld computer includes PALM OS, manufactured by PALM INC., or POCKET PC, manufactured by MICROSOFT.

In an embodiment, a handheld computer 700 includes a processor 740 coupled to a first memory 744 (non-volatile) and a second memory 746 (volatile). The processor 740 is coupled to a display driver 722. The processor 740 combines with display driver 722 to process and signal data for presentation on a display assembly 720. The display assembly 720 may include screen and digitizer components, as described in FIG. 2B.

In an embodiment, a sensor system 764 may be provided to detect orientation information. The sensor system 764 may comprise information compiled from a plurality of actuated sensor pads, such as shown in FIGS. 3 and 4. The orientation information may be detected as an analog value.

An analog-digital (AD) converter 732 is coupled to processor 740. The sensor system 764 signals orientation information to processor 740 via A/D converter 732. In addition, one or more channels 736 from A/D converter 732 maybe used to convert analog input provided by the digitizer, or by another analog input mechanism.

The handheld computer 700 may include one or more expansion ports for coupling to accessory devices, such as cradles, modems, memory units, re-chargers and other devices. Examples of expansion ports include serial ports, Universal Serial Bus (USB) ports, CompactFlash slots and infra-red ports. In an embodiment shown, an expansion port 702 enables one or more types of expansion modules to be connected to processor 740.

A power supply 755 may provide power to one or more internal components of the handheld computer 700. The power supply may correspond to a rechargeable or disposable battery set.

F. Alternative Buttons

While embodiments described herein provide for symmetrical electronic devices that are square in shape, other embodiments may use other symmetrical shapes. For example, the electronic device may be circular in shape.

While user-interface features described herein have focused on display and buttons, other embodiments may provide for other types features that can be oriented with orientation information. For example, connector ports, housing features and other components are configurable with orientation information.

G. CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An electronic device comprising:
   a set of user-interface features provided on a face of a housing of the electronic device;
   one or more components, including at least one processor, that is configured to (i) identify whether the electronic device is being operated in a first orientation or in a second orientation, and (ii) assign one or more functions to each of the set of user-interface features based on whether the electronic device is being operated in the first orientation or in the second orientation;
   wherein the processor is configured to assign the one or more functions to each of the set of user-interface features by assigning, for at least a first user-interface feature in the set, (i) a first function for when the first user-interface feature is actuated while the electronic device is operated in the first orientation, and (ii) a second function for when the first user-interface feature is actuated while the electronic device is operated in the second orientation; and
   wherein each of the first function and second function excludes any function assigned to any other user-interface feature in the set of user-interface features in both of the first orientation and the second orientation.

2. The electronic device of claim 1, wherein the set of user-interface features are symmetrically disposed about a first axis, and wherein the orientation defines a reference indication on the first axis.

3. The electronic device of claim 1, wherein the set of user-interface features are symmetrically disposed about a first axis and a second axis, and wherein the orientation defines a first reference indication on the first axis, and a second reference indication on a second axis.

4. The electronic device of claim 1, wherein the set of user-interface features includes a set of buttons disposed symmetrically about a first axis, wherein the at least one processor selects the orientation of the set of buttons by specifying a reference indication that defines a position of each button relative to the first axis, and wherein the processor assigns a function from a set of functions to each of the plurality of buttons based on the position of each button.

5. The electronic device of claim 1, wherein one or more components include a display driver.

6. The electronic device of claim 1, further comprising a detection mechanism to detect orientation information about the electronic device.

7. The electronic device of claim 6, wherein the detection mechanism includes a plurality of sensor areas that detect user-contact.

8. The electronic device of claim 7, further comprising a sensor to detect whether the electronic device is operated in the first orientation or the second orientation, wherein the sensor provides the at least one processor with orientation information that identifies the orientation in which the electronic device is operated; and
   wherein the plurality of sensor areas detect orientation information by being individually actuatable so that one or more actuated sensor areas form a select portion of the plurality of sensors that combine to define the orientation information.

9. The electronic device of claim 1, wherein the set of user-interface features includes a first actuatable surface and a second actuatable surface provided on the face of the housing, wherein the processor identifies whether the electronic device is operated in the first orientation or the second orientation by determining which of the first and second actuatable surface is actuated by user-contact.

10. The electronic device of claim 1, wherein the set of user-interface features includes one or more buttons.

11. The electronic device of claim 10, wherein the one or more user-input mechanisms are positioned adjacent to the display on the face of the housing, so as to promote the one or more user-input mechanisms to be useable in conjunction with the display when the electronic device is in the first orientation or the second orientation.

12. The electronic device of claim 1, wherein the set of user-interface features includes one or more mechanical actuation mechanisms.

13. The electronic device of claim 1, wherein the set of user-interface features includes one or more sensor pads.

14. A method for configuring an electronic device, the method comprising:
   detecting at least one user interaction with a first user-interface feature in a set of user-interface features of an electronic device;
   interpreting an orientation of the electronic device being operated by the user, based on the interaction of the user with the user-interface feature; and
   configuring at least the first user-interface feature in the set of user-interface features according to the interpreted orientation, by assigning, for at least the first user-interface feature, (i) a first function for when the first user-interface feature is actuated while the electronic device is interpreted as being operated in the first orientation, and (ii) a second function for while the first user-interface feature is actuated when the electronic device is interpreted as being operated in the second orientation; and
   wherein each of the first function and second function excludes any function assigned to any other user-interface feature of the set of user-interface features in both of the first orientation and the second orientation.

15. The method of claim 14, wherein interpreting an orientation includes determining a reference indication of the user-interface feature about one or more axes from the one or more contacts.

16. The method of claim 15, further comprising determining reference indication about one or more axes that the user-interface feature is symmetrically disposed about.

17. The method of claim 15, wherein determining the reference indication includes determining a direction for content appearing on a display.

18. The method of claim 15, wherein configuring the at least first user-interface feature includes assigning a function to each button in a button set using the reference indication.

19. A method for operating an electronic device, the method comprising:
   detecting whether the electronic device is being operated in either a first orientation or a second orientation;
   automatically selecting a configuration for at least a first user-interface feature in a set of one or more user-interface features by assigning the first user-interface features to have one of (i) a first function for when the electronic device is in the first orientation, or (ii) a second function for when the electronic device is in the second orientation, wherein the set of user-interface features are separate from a display of the electronic device; and
   wherein each of the first function and second function of the first user-interface feature excludes any function assigned to any other user-interface feature in the set of user-interface features in both of the first orientation and the second orientation.

20. The method of claim 19, further comprising automatically displaying a first output for when the first user-interface features is operated and assigned the first function, and a second output for when the first user-interface features is operated and assigned the second function.

21. The method of claim 20, wherein automatically displaying a first output includes displaying the first output to correspond to the first orientation and wherein automatically displaying a second output includes displaying the second output to correspond to the second orientation.

22. The method of claim 19, wherein detecting whether the electronic device is being operated in either the first orientation or the second orientation includes making a determination as to whether the electronic device is held in a first direction or in a second direction that is perpendicular to the first direction.

23. The method of claim 19, wherein detecting whether the electronic device is being operated in either the first orientation or the second orientation is based on actuation of the first user-interface feature in the set.

24. The method of claim 19, wherein detecting whether the electronic device is being operated in either a first orientation or the second orientation includes detecting how the electronic device is being held by a user.

25. The method of claim 19, further comprising enabling at least one user-input mechanism to be active based on whether the device is the first orientation or the second orientation.

26. The method of claim 19, wherein detecting whether the electronic devices is being operated in either the first orientation or the second orientation includes making a determination that a user-input mechanism has been actuated by a user when the device is either in the first orientation or the second orientation.

* * * * *